United States Patent [19]

Larsen

[11] 4,134,016

[45] Jan. 9, 1979

[54] COLD NEUTRON RADIOGRAPHIC APPARATUS AND METHOD

[75] Inventor: John E. Larsen, La Jolla, Calif.

[73] Assignee: Helix Technology Corporation, Waltham, Mass.

[21] Appl. No.: 788,391

[22] Filed: Apr. 18, 1977

[51] Int. Cl.$^2$ .................................................. G01T 3/00

[52] U.S. Cl. ...................................................... 250/392

[58] Field of Search ............... 250/390, 391, 392, 499, 250/500, 501, 503, 510

[56] References Cited

U.S. PATENT DOCUMENTS 3,496,358 2/1970 Barton ................................. 250/391

3,659,106 4/1972 Cason .................................. 250/510

*Primary Examiner*—Alfred E. Smith
*Assistant Examiner*—Janice A. Howell
*Attorney, Agent, or Firm*—David E. Brook

[57] ABSTRACT

An improved cold neutron radiographic apparatus and method are disclosed wherein neutron temperature is matched to the specific material to be examined. This can be done, in one embodiment, by placing a radioactive source of neutrons, such as californium 252, in a moderator such as solid methane and using a cryogenic refrigeration system to cool the moderator to any preselected cryogenic temperature.

15 Claims, 12 Drawing Figures

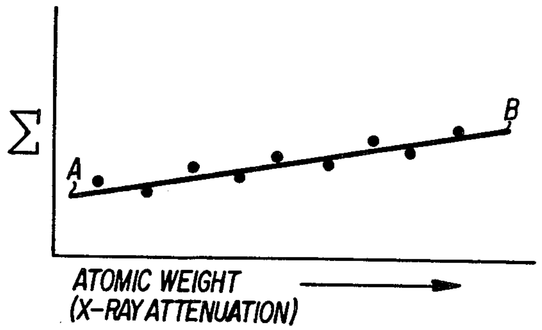
FIG. 1
FIG. 2
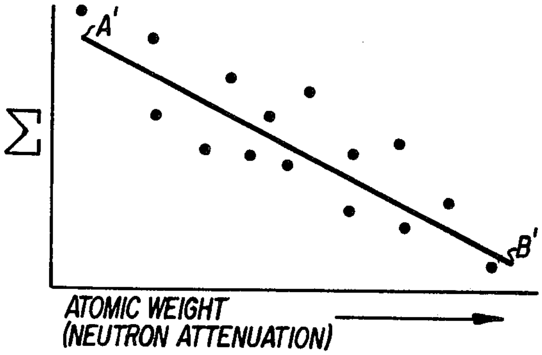
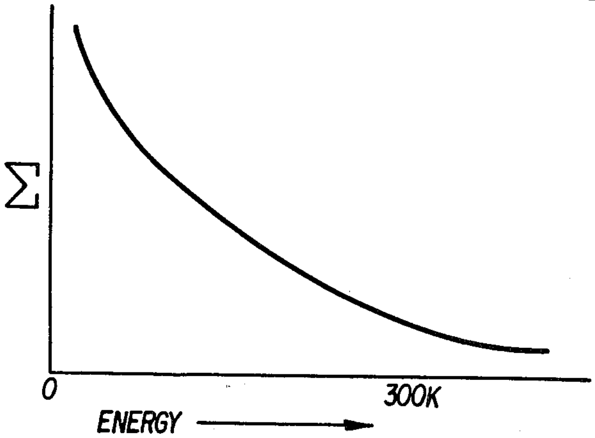
FIG. 3
FIG. 7
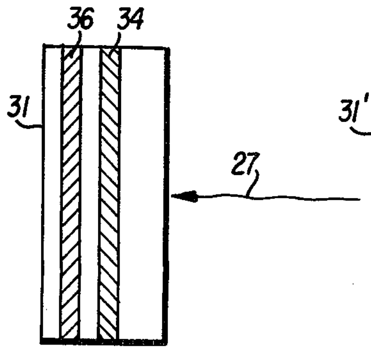
FIG. 8
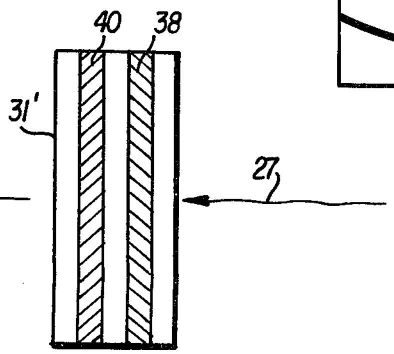
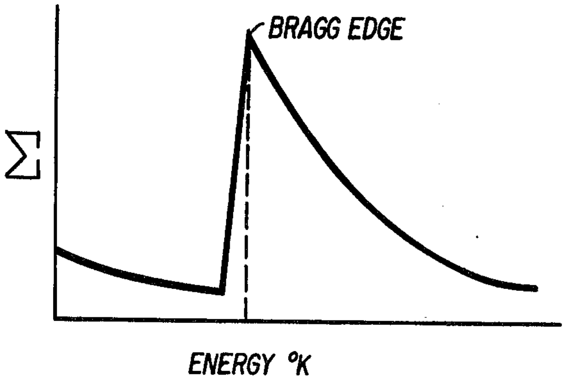
FIG. 4

COLD NEUTRON RADIOGRAPHIC APPARATUS AND METHOD

BACKGROUND OF THE INVENTION

1. Field of the Invention

This invention is in the field of neutron radiography.

2. Description of the Prior Art

Metals have long been subjected to x-ray and gamma ray radiographic analysis. The transmission of such rays through a metal object, however, decreases as atomic weight increases; and, moreover, the degree of transmission through low atomic weight elements differs from that through high atomic weight elements by a factor of only about ten. Hence, it is often difficult to obtain good contrast using x-rays or gamma rays.

More recently, attempts have been made to utilize neutrons in radiographic techniques. While the degree of neutron transmission with atomic weight does not follow a smooth curve, certain high atomic weight materials are as much as 10,000 times more transmissive than certain low atomic weight elements such as hydrogen which is particularly opaque to neutron radiation.

The attenuation of neutrons as they pass through a material is a function of several parameters. In general, the attenuation can be described by the formula:

$$\Sigma = N(\sigma_s + \sigma_a),$$

wherein:

$\Sigma$ = attenuation coefficient;

N = atom density of the bombarded material;

$\sigma_s$ = tendency of the given nucleus to "scatter" neutrons passing therethrough; and, $\sigma_a$ = tendency of the given nucleus to absorb neutrons.

Neutrons, of course, can have a wide range of energy levels and it is known that the attenuation coefficient ($\Sigma$) varies with neutron energy level. A convenient way for specifying neutron energy is in terms of neutron temperature, with absolute zero being equivalent to zero energy. Using this convention, there is a general tendency for materials to become more opaque with lower temperature neutrons. Nevertheless, there are some materials which exhibit a sharp decrease in attenuation coefficient below a certain neutron energy level or temperature, which is often referred to as the "Bragg edge." Below the "Bragg edge," these materials display a decrease in the coherent scattering effect which produces a corresponding drop in their attenuation coefficient ($\Sigma$). Typically, the attenuation coefficient ($\Sigma$) starts to drop off at energies below the "Bragg edge" to a minimum at some discrete temperature after which a slight rise takes place as the energy level is lowered towards absolute zero. For purposes of convenience, neutrons having temperatures in the region of the Bragg edge will be described herein as "cold" neutrons whereas those having temperatures above the Bragg edge will be referred to as "thermal" neutrons (generally above about 0.005 ev).

Cold neutron radiography, i.e., radiography using cold neutrons, has been proposed to analyze iron, which is known to have a Bragg edge. U.S. Pat. No. 3,496,358, to Barton, for example, describes such a technique wherein neutrons produced in a nuclear reactor are used to bombard the iron sample. Attenuation of the cold neutrons by the iron sample is recorded on an imaging system.

The Barton apparatus relies upon a berylium filter cooled with liquid nitrogen to filter leakage neutrons formed in the nuclear reactor so that a beam of neutrons with energies below 0.005 electron-volts can be used to bombard the iron sample. There is no attempt by Barton to form a beam of neutrons at a predetermined temperature, but only an attempt to filter out neutrons having energies above those at which the berylium filter is transparent to neutrons.

SUMMARY OF THE INVENTION

This invention relates to the improvement in cold neutron radiography of matching neutron temperature to the specific material to be analyzed. Thus, it is possible, for example, to bombard the material with neutrons having the precise average temperature necessary to realize the minimum attenuation coefficient ($\Sigma$). It is also possible to choose a neutron temperature that would increase the attenuation by inclusions, defects, etc., or to choose a neutron temperature that provides a good balance between sample transmission and defect attenuation. Other neutron temperatures might also be chosen for other reasons.

In one embodiment, a source of neutrons is embedded in a moderator material, such as solid methane, and the moderator material is cooled to the desired temperature by a cryogenic refrigerator. In another embodiment, neutrons from a nuclear reactor are passed through a moderator cooled by a cryogenic refrigerator. Since the neutron temperature is matched to the material being radiographically inspected, improved contrast and resolution can be obtained through thicker materials than it has heretofore been possible to analyze by cold neutron radiography.

More optimum filtering of a neutron beam is also achieved by using a cryogenic refrigerator to cool the neutron beam filter.

BRIEF DESCRIPTION OF THE DRAWINGS

FIG. 1 is a generalized plot of the attenuation coefficient for x-rays versus the atomic weight of materials;

FIG. 2 is a generalized plot of the attenuation coefficient of neutrons versus the atomic weight of materials;

FIG. 3 is a plot illustrating the general relationship between attenuation coefficient for neutrons versus the energy level of the neutrons;

FIG. 4 is a plot illustrating the "Bragg-edge" phenomenon known for some materials;

FIG. 7 is a cross-sectional view of one embodiment of a detector which can be used in the practice of this invention;

FIG. 8 is a cross-sectional view of an alternative embodiment of a detector which can be used in the practice of this invention;

DESCRIPTION OF PREFERRED EMBODIMENTS

The plots presented in FIGS. 1 and 2 illustrate the significant differences between the attenuation of x-rays and the attenuation of neutrons with increasing atomic weight. As can be seen from FIG. 1, the attenuation coefficient for x-rays increases relatively smoothly with increasing atomic weight. Neutron attenuation, on the other hand, has a general overall decrease in attenuation with increasing atomic weight. Additionally, there are often large differences between the attenuation of neutrons through elements having similar atomic weights although the plot shown illustrates the general tendency. There are also significant differences in the vertical scales for x-rays and neutrons, respectively. Whereas a typical difference in attenuation coefficient between points A and B in FIG. 1, for example, might be a factor of 10, the difference in neutron attenuation in FIG. 2 between points A' and B' might typically be in the order of 10,000.

FIG. 3 illustrates the general tendency for elements to become more opaque as neutron energy decreases. Despite this general tendency, there are some materials which exhibit a sharp decrease in attenuation coefficient ($\Sigma$) at low energies. See, *Neutron Radiography — Methods, Capabilities, and Applications* by H. Berger (1965), Elsevier, Amsterdam (1965). The point where such attenuation begins to drop off is referred to the "Bragg-edge" and is illustrated in the plot in FIG. 4 for a typical material.

Figure 5:
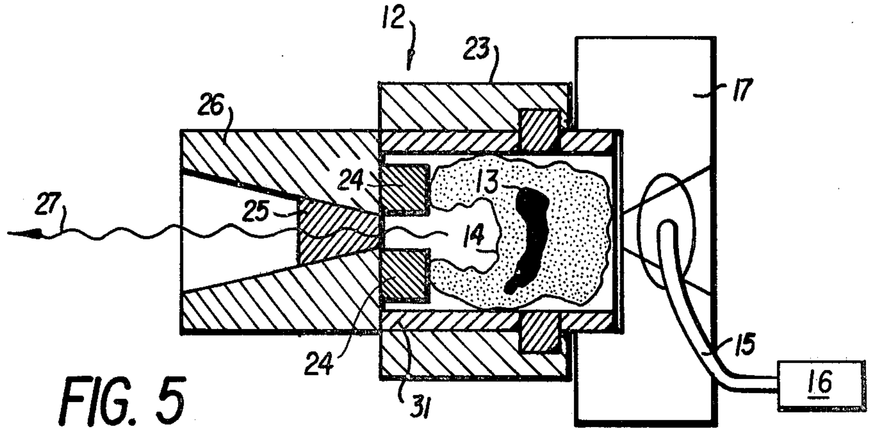
FIG. 5 is a cut-away elevational view of an apparatus according to this invention.

In FIG. 5, an apparatus for producing a beam of neutrons having a pre-selected temperature is illustrated. The apparatus 12 includes a neutron source 13, such as californium 252, located in a moderator 14, such as solid methane or liquid hydrogen. The moderator 14, in turn, is cooled by cold probe 15 extending from cryogenic refrigerator 16 and through rear support 17 to moderator 14. Cryogenic refrigerator 16 can be any of those well known to the art, such as CRYODYNE® refrigerators manufactured by Helix Technology Corp., Waltham, Ma.

Moderator 14 is located within a cryostat-type vessel 23, having suitable neutron reflectors and shielding 31 and an aperture formed in cylinder 24 which can be formed from neutron opaque materials such as $Li_6F$ and indium. Cold neutrons generated at a pre-selected temperature in the moderator material pass through the aperture to neutron filter 25, which filters out any neutrons generated which have energies significantly above the Bragg cutoff. Collimator 26 directs the filtered beam 27 towards an object or objects to be analyzed.

Figure 6:
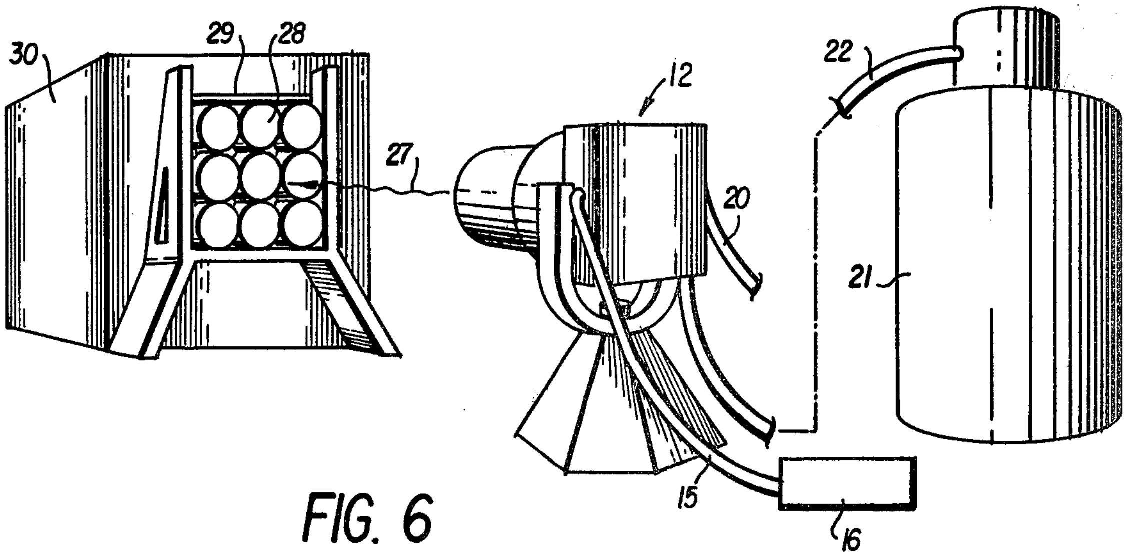
FIG. 6 is a perspective view of an apparatus according to this invention.

In FIG. 6, a cold neutron beam generator, such as that illustrated in FIG. 5, is illustrated in combination with other elements which together form a neutron radiographic apparatus. Similar elements are given similar numeral designations. Cold neutron beam 27 is directed towards the objects 28 to be analyzed. Neutrons which pass through the objects 28 impinge upon a neutron detector system 29 which has a beam stop material 30 positioned behind it. Source storage cask 21 is used to store the radioactive isotope source when the system is not in use. The source is pneumatically transferred from moderator 14 to storage cask 21 through connecting line 22.

The apparatus illustrated in FIGS. 5 and 6 can be employed as follows. A neutron source comprising one or more milligrams of californium 252 are placed in a solid methane moderator brought to approximately 24° K. by cryogenic refrigerator 16. The resulting cold neutrons have an energy spectrum of about 0.002 electron volts or less. These are directed toward a test target comprised of zirconium cylinders 10" thick, but having inclusions therein as small as 0.020" wide. A photographic-type neutron detector is used to monitor the output, and a clear image is produced which has little fogging, excellent contrast and good object resolution.

One of the significant advantages of the cold neutron radiographic apparatus described herein can be illustrated by referring to the following tables. As previously described, materials exhibiting a Bragg edge have their maximum transmission to neutrons at a finite neutron energy or temperature. The following are the neutron energies and moderator temperatures for maximum neutron transmission through a number of Bragg edge materials:

| ELEMENT | NEUTRON ENERGY (ev) | MODERATOR TEMPERATURE (° K) |
|---|---|---|
| Be | 0.005 | 58 |
| BeO | 0.003 | 35 |
| C | 0.0015 | 17.4 |
| Al | 0.0035 | 41 |
| Fe | 0.0045 | 52 |
| Ni | 0.0046 | 53 |
| Zr | 0.0021 | 24 |
| Sn | 0.0090 | 104 |
| Pb | 0.0012 | 14 |
| Bi | 0.0006 | 7. |

Cooling neutrons with cryogens, as has previously been done, is not sufficient since it is either impossible or difficult in many cases to obtain the desired neutron temperature for analysis of a specific sample. This can be appreciated by contrasting the temperature range available with standard cryogens to the neutron temperatures desired as set forth above. Standard cryogens have the following boiling and freezing points:

| MATERIAL OR ELEMENT | ° K BOILING POINT | K FREEZING POINT |
|---|---|---|
| Oxygen | 90.2 | 54.5 |
| Nitrogen | 77.3 | 63.1 |
| Argon | 87.3 | 83.8 |
| Krypton | 119.9 | 116.5 |
| Xenon | 165.1 | 161.3 |
| Neon | 24.5 | 21.1 |
| Methane | 111.7 | 90.6 |
| Ethylene 169.3 | 104 | |
| Hydrogen | 20.3 | 13.8 |
| Carbon Dioxide | Directly to Gas at 1 ATM | 216.6 |
| Fluorine | 85.2 | 53.5 |
| Helium | 4.2 | 2. |

The advantage of having the capability to adjust neutron temperatures over a continuous range of cryogenic temperatures is clear from these tables.

Since neutrons have a tendency to pass completely through conventional x-ray film without interaction, it cannot be used alone as a detector. Where it is desirable to have a photographic reproduction of the output, a modified film pack or cartridge 31, as illustrated in FIG. 7, can be used in the cold neutron beam. Film pack 31 contains a sheet of x-ray film 34 and additionally a thin (e.g., 0.001") layer of gadolinium foil 36. Neutrons absorbed by the gadolinium foil cause the emission of electrons thereby exposing x-ray film 34 which records a permanent image.

An alternative film pack 31' is illustrated in FIG. 8. In film pack 31', cold neutrons are first absorbed by substrate 38 which contains a mixture of gadolinium and a scintillating material, such as a phosphor. Neutrons absorbed by the gadolinium substrate 38 cause the phosphor to emit a corresponding amount of visible light which is sufficient to expose conventional photographic film such as film plate 40. In this manner, more conventional films can be used which have speeds of as much as 100 times those of x-ray films.

Figure 9:
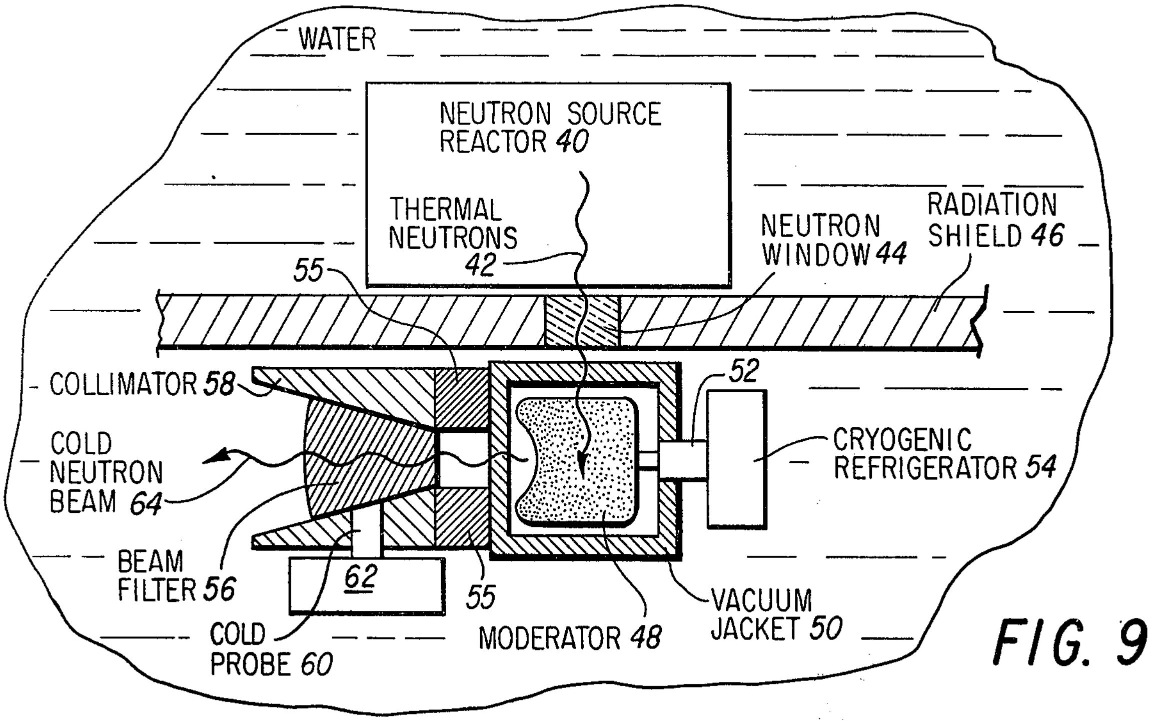
FIG. 9 is a cut-away view of an alternative embodiment for the apparatus according to this invention; and, FIGS. 10–12 are plots illustrating the variations in neutron filtering at different temperatures for $_{82}Pb$, $_{4}Be$, and Bi, respectively.

FIG. 9 illustrates a different embodiment of an apparatus of this invention. As shown, the source of neutrons is a neutron source reactor 40. As is known, reactors such as reactor 40 produce copious amounts of thermal neutrons. Leakage neutrons 42 pass through neutron window 44 provided in radiation shield 46. Suitable materials for neutron window 44 include a single crystal of lead fluoride or bismuth oriented in a direction to maximize neutron transmission. Radiation shield 46 might be lead or other known gamma ray shields.

After passing through neutron window 44, neutrons 42 enter the moderator material 48, which as previously described might be solid methane. Moderator material 48 is contained under vacuum conditions by vacuum jacket 50. The cold probe 52 from a cryogenic refrigeration system 54 is used to cool moderator 48 to any preselected temperature. Thus, the thermal neutrons entering moderator 48 in beam 42 are cooled to produce cold neutrons.

Neutrons which have been cooled pass through an aperture formed in cylinder 55, through beam filter 56, and are collimated by collimator 58. Suitable materials for collimator 58 can be formed from bismuth or berylium, and as shown is also cooled by the cold probe 60 from cryogenic refrigerator 62. Since it is known that the filtering properties of materials such as bismuth or berylium vary with temperature, it is possible to adjust the filtering properties of beam filter 56 by adjusting the temperature through cryogenic refrigerator 64.

The result is a beam 62 of cold neutrons adjusted to the pre-selected temperature desired. Thus, the beam of neutrons is matched to the properties of the material to be bombarded and analyzed.

Typically, the apparatus as illustrated in FIG. 9 would be submerged under water since the core of many nuclear reactors are so submerged.

In practice, the distance between the moderator material and source of neutrons can be adjusted for optimum performance. These distances are tailored, of course, to suit the specific spectrum of neutron energies and specific moderator material and configuration or shape.

Figure 10:
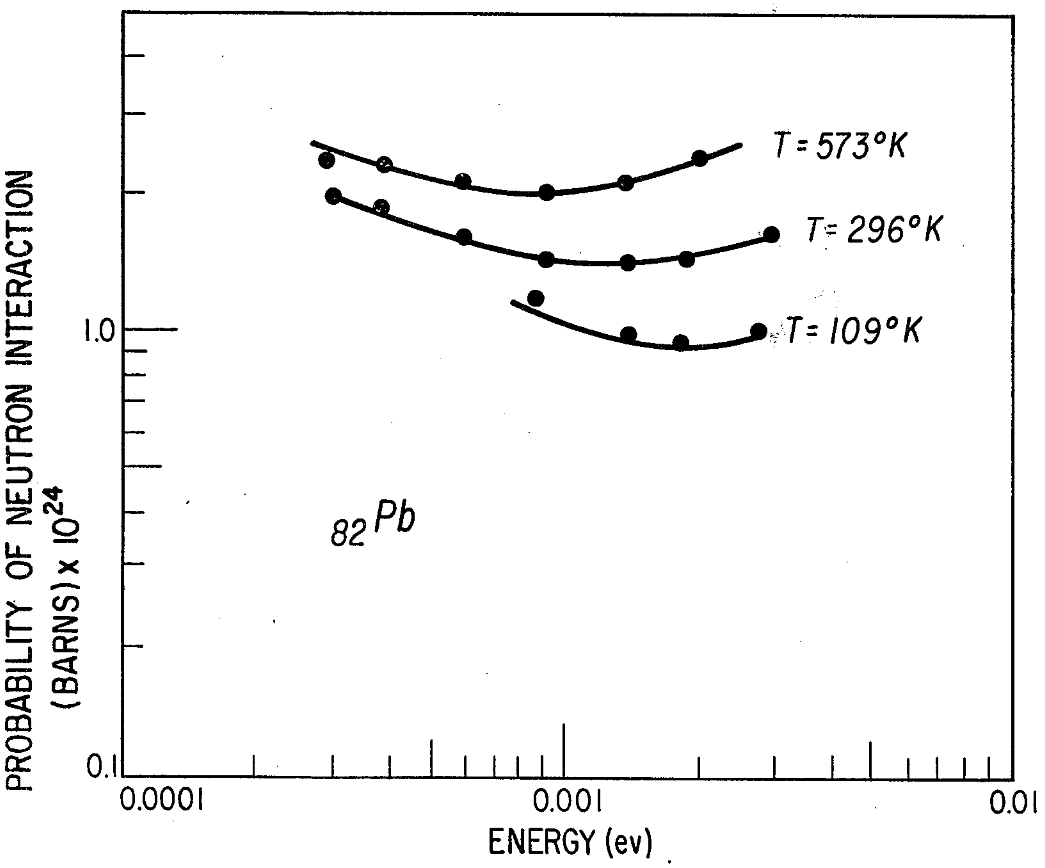
Figure 11:
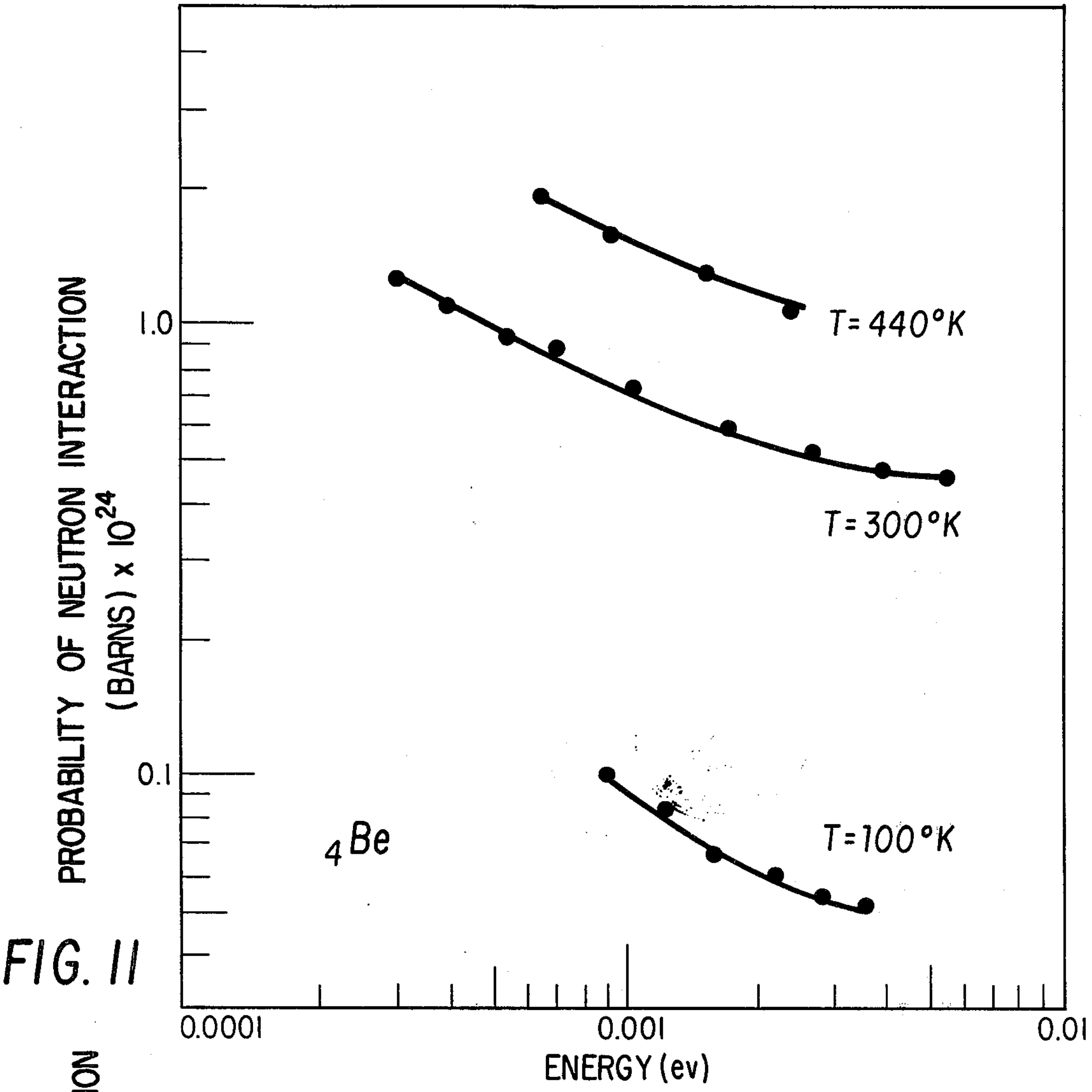
Figure 12:
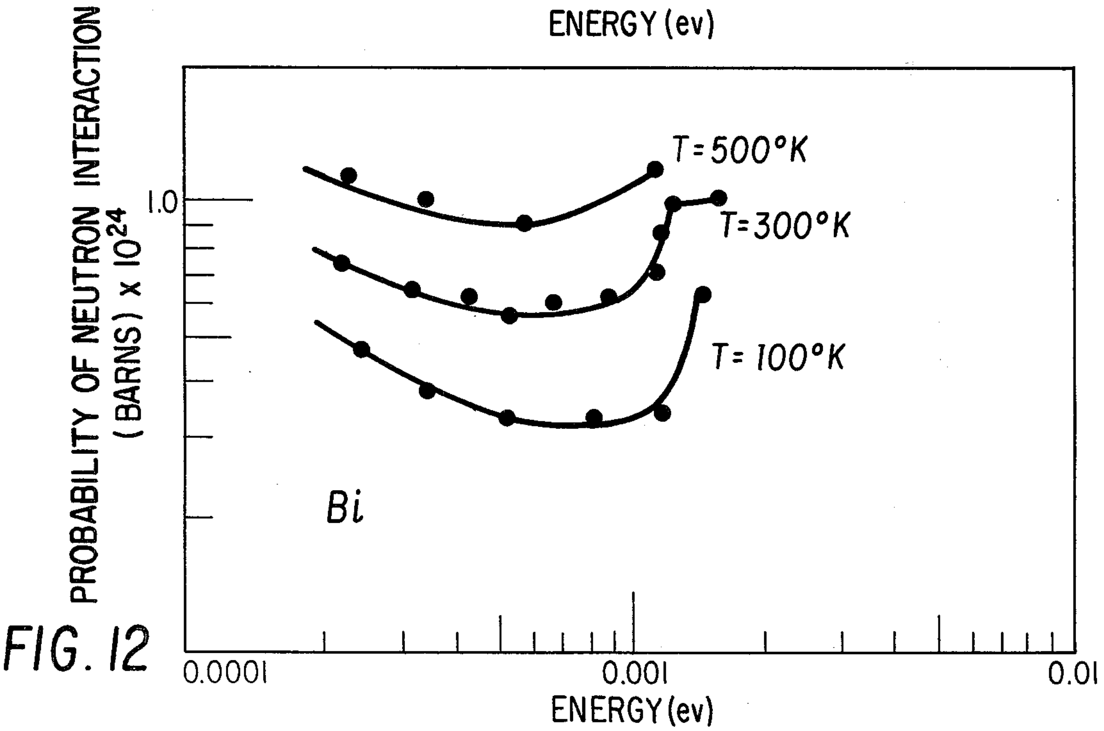

FIGS. 10–12 illustrate the differing filtering properties of $_{82}Pb$, $_{4}Be$, and Bi, respectively, with temperature. These plots illustrate the importance of being able to have a continuous range of cryogenic temperatures available at the filter, such as are provided by using cryogenic refrigerator systems to cool the neutron beam filter.

Those skilled in the art will recognize, or be able to ascertain using no more than routine experimentation, many equivalents to the specific, apparatus, elements, steps, procedures, materials, etc., specifically described herein. Such equivalents are intended to be covered by the following claims.

What is claimed is:

1. In an apparatus for the radiographic examination of a sample with a beam of cold neutrons, said apparatus including a source of neutrons, means for forming a beam of neutrons, means for directing said beam of neutrons to the sample, and means for detecting the attenuation of said beam of neutrons by the sample:

The improvement of providing a moderator material for said neutrons and cryogenic refrigeration means for cooling said moderator material to a range of cryogenic temperatures, whereby the neutrons may be cooled to a temperature matched to the sample to be examined.

2. The improvement of claim 1 wherein said moderator material comprises solid methane.

3. Cold neutron radiographic apparatus, comprising, in combination:

a. a source of neutrons;
b. a moderator for said neutrons;
c. means for cooling said moderator to a range of cryogenic temperatures, whereby the neutrons may be cooled to a temperature matched to the sample to be examined;
d. means for forming said neutrons into a beam;
e. means for directing said beam to a sample; and,
f. means for detecting attenuation of said beam by the sample.

4. Cold neutron radiographic apparatus of claim 3 wherein said means for cooling comprise a cryogenic refrigeration system.

5. Cryogenic neutron radiographic apparatus of claim 4 wherein said source of neutrons comprises a nuclear reactor.

6. Cold neutron radiographic apparatus of claim 4 wherein said source of neutrons comprises a radioactive isotope.

7. Cold neutron radiographic apparatus of claim 6 wherein said radioactive isotope comprises californium 252.

8. Cold neutron radiographic apparatus of claim 5 wherein said moderator comprises solid methane.

9. Cold neutron radiographic apparatus of claim 6 wherein said moderator comprises solid methane.

10. In the radiographic method of examining a sample comprising forming a beam of neutrons, bombarding the sample with said beam and detecting attenuation of the beam:

The improvement comprising cooling said neutrons to a temperature matched to the sample to be examined.

11. The improvement of claim 10 wherein said neutrons are cooled to a temperature at which minimum attenuation of the neutrons occurs as they pass through the sample.

12. The improvement of claim 10 wherein said neutrons are cooled to a temperature selected to increase attenuation by sample defects.

13. In apparatus for the radiographic examination of a sample with a beam of cold neutrons, said apparatus including a source of neutrons, a filter for filtering out thermal neutrons, means for directing a beam of neutrons to the sample, and means for detecting the attenuation of said neutrons by the sample:

The improvement of cooling said filter with a cryogenic refrigerator whereby said filter can be cooled to a range of cryogenic temperatures.

14. In an apparatus for the radiographic examination of a sample with a beam of cold neutrons, said apparatus including a source of neutrons, a moderator material for said neutrons, means for forming a beam of neutrons, means for directing said beam of neutrons to the sample, and means for detecting the attenuation of said beam of neutrons by the sample:

The improvement wherein said moderator material comprises a solid material.

15. In an apparatus for the radiographic examination of a sample with a beam of cold neutrons, said apparatus including a source of neutrons, a moderator material for said neutrons, means for forming a beam of neutrons, means for directing said beam of neutrons to the sample, and means for detecting the attenuation of said beam of neutrons by the sample:

The improvement wherein said moderator material comprises solid methane.

* * * * *